July 2, 1963
R. S. FARR
3,096,430
WELDING HOOD
Filed April 10, 1961
2 Sheets-Sheet 1
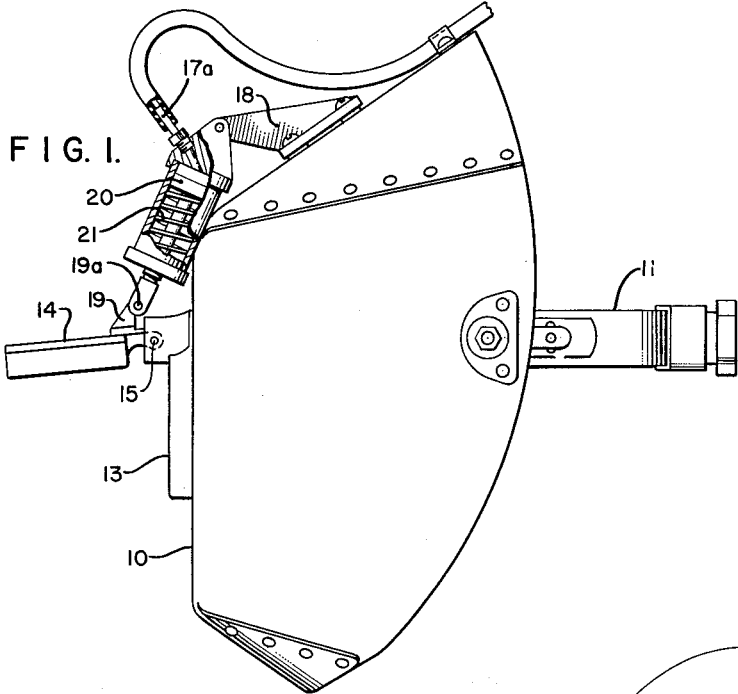
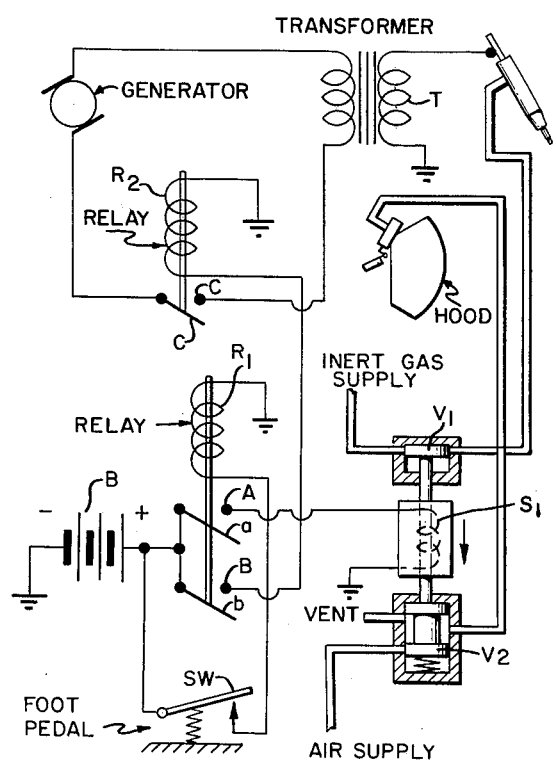
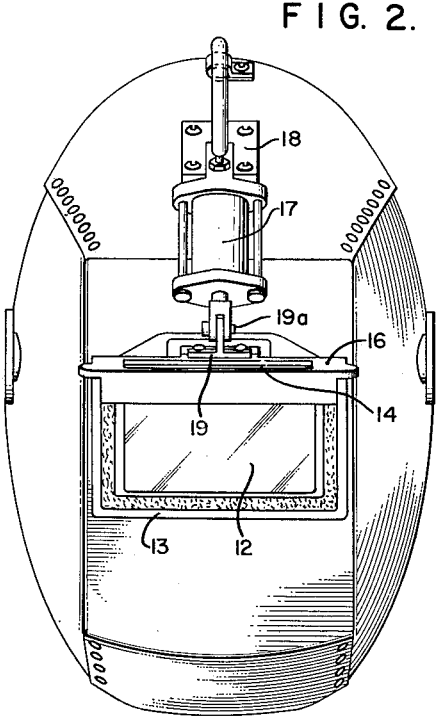
*INVENTOR.*
RICHARD S. FARR
BY
*Lyon & Lyon*
ATTORNEYS

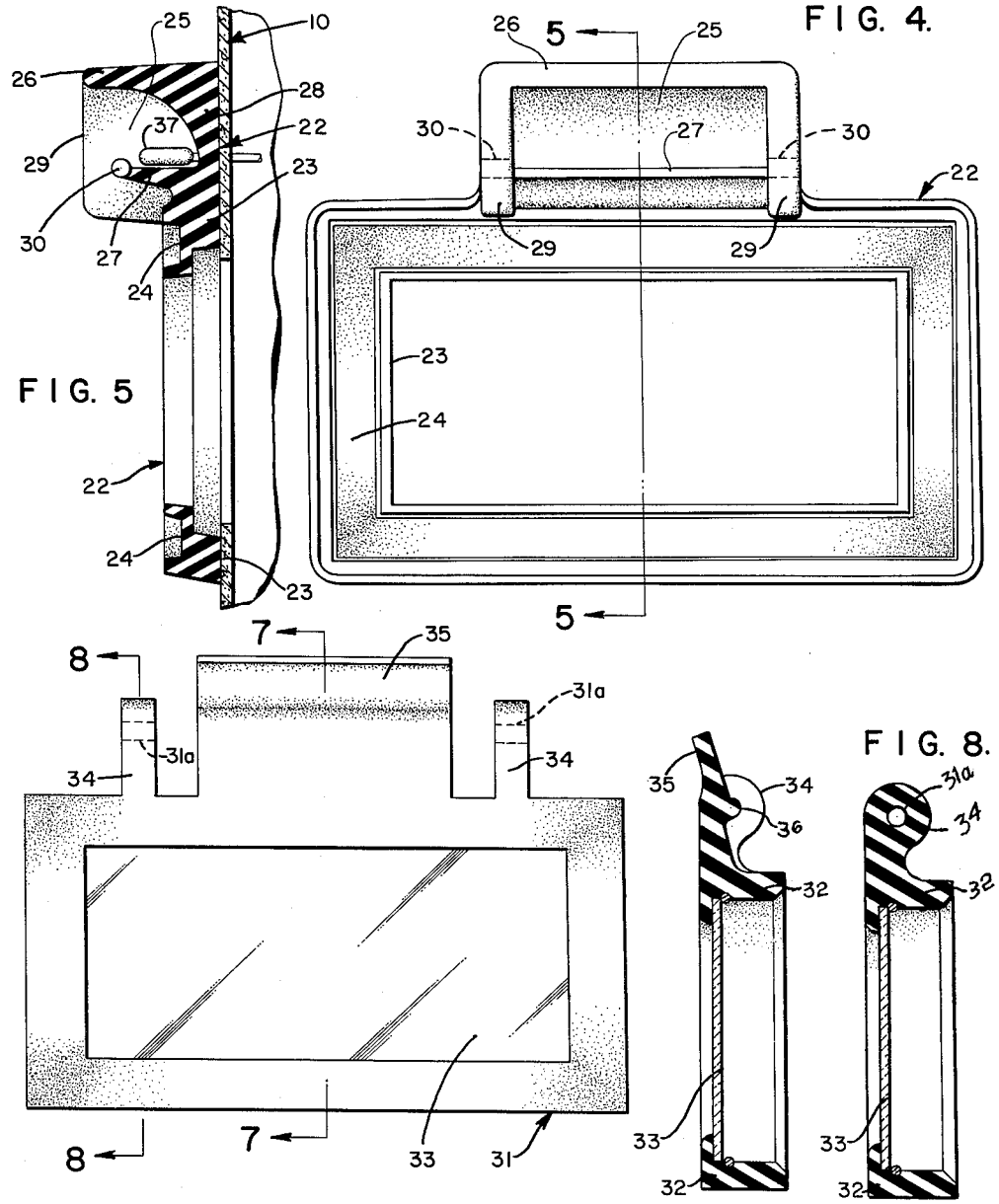

United States Patent Office 3,096,430
Patented July 2, 1963

3,096,430
WELDING HOOD
Richard S. Farr, 4542 Don Felipe Drive,
Los Angeles 8, Calif.
Filed Apr. 10, 1961, Ser. No. 101,990
15 Claims. (Cl. 219—147)

My invention relates to the art of electric arc welding and more specifically to an improved automatic welding hood to protect the eyes of the welder against injury from the welding arc.

As is well known, the electric arc employed in arc welding is of such intensity that it will seriously harm the naked eye and to protect against this, a near opaque glass shield is customarily used by the welder. Such a shield is normally a part of a welding hood worn by the welder. Thus, the usual welding hood consists of a face mask or helmet which is hingedly carried by a harness fastened to the head of the welder. The front portion of the helmet consists of a highly opaque glass eye piece through which the welder observes his work during the welding operation. The opacity of the glass eye piece, however, is sufficiently high that the welder can see little or nothing through it in the absence of the brilliant welding arc. For this reason, before the arc is struck, the shield must be out of the path of vision of the welder to permit him to position his welding torch or electrode over the spot where the weld is to be made or commenced. In practice, the welder must tip up his hood, position his welding instrument, lower the hood so as to place the protective eye shield before his eyes and then strike the arc.

This sequence of operations is both troublesome and time consuming and markedly lowers the speed and proficiency of a welder. Thus, in the case of relatively long welds, most welders will periodically break the arc and lift their hood to better examine the progress of their work. This requires the repeated manipulation of the hood in the manner described. The matter is even more aggravated in the case of spot or tack welding where the welder must repeatedly strike and then break his arc in a different location. Indeed, it frequently occurs that the welder spends considerably more time manipulating his hood than actually welding.

Numerous attempts have been made in the past to alleviate this problem by providing some form of automatic operation whereby the welder's hood, or at least the glass shield portion thereof, will automatically be raised when the arc is broken and lowered when the arc is struck. None of these attempts has been commercially successful, however, because the hoods proposed have been cumbersome and impractical in several respects. Thus, the apparatus has normally added so much weight to the normal hood that the welders will not tolerate it. Additionally, such devices have been difficult to integrate with existing welding equipment and usually require the welder to perform some additional operation such as throwing a special switch which is time consuming and objectionable to the welder. Finally, the majority of such devices have not incorporated adequate safety features with the result that the welder may strike an arc with his glass plate tipped up, thereby damaging his eyes.

In accordance with the present invention, these several difficulties are overcome and an automatic welding hood is provided which is exceedingly simple in construction, light in weight, safe in operation and requires no additional operation by the welder.

Accordingly, it is an object of the invention to provide an improved automatic welding hood.

It is another object of the invention to provide such a welding hood which is simple, compact and of light weight.

It is another object of the invention to provide such a welding hood wherein the protective glass face plate will be lowered in position before the welding arc is struck.

It is a further object of my invention to provide such a welding hood that can be readily attached to existing commercial welding equipment.

These and other objects will be apparent in the course of the description of the invention which follows.

In the drawings:

FIG. 1 is a side elevation view of a welding hood constructed in accordance with the invention.

FIG. 2 is a front elevation view of the welding hood shown in FIG. 1.

FIG. 3 is a diagrammatic illustration of the electrical and pneumatic controls for a welding machine incorporating the welding hood of the present invention.

FIG. 4 is a front elevation view of the receiving frame of a modification of the invention.

FIG. 5 is a view taken along the line 5—5 of FIG. 4.

FIG. 6 is a front elevational view of the face plate carrier of the device of FIGS. 4 and 5.

FIG. 7 is a view taken along the line 7—7 of FIG. 6.

FIG. 8 is a view taken along the line 8—8 of FIG. 6.

Referring to FIGS. 1 and 2, the welding hood of the present invention is seen to consist of a helmet 10 hingedly carried by a head harness 11. This helmet and head harness arrangement is conventional in the art and in the front wall of such a helmet is normally provided a fixed opaque glass face plate shield. In accordance with the present invention, there is provided instead an opening 12 encompassed by a fixed receiving frame 13. This frame may carry a clear glass window the purpose of which is simply to protect the eyes of the welder when he is chipping or blowing slag from a recently formed weld. If desired, however, this clear glass window may be omitted and the frame used merely to receive and support the eye shield in a manner to be described.

In the embodiment shown in FIG. 1, the opaque glass face plate 14 is hingedly carried by the helmet being hinged to the window frame 13 at 15. This face plate 14 includes a frame 16 which carries the dark or opaque glass. The face plate 14 is hingedly supported as shown so that it may be readily placed into or out of the welder's line of vision. Thus, an air cylinder 17 is provided which is carried by a bracket 18 secured to the top of the helmet. The air cylinder is also hingedly linked by pin 19a to a bracket 19 which is rigidly secured to the face plate 14 as shown. When air pressure is applied to the air inlet port 17a of the air cylinder, thereby extending the air cylinder piston 20, the face plate 14 closes. When the air pressure is removed, a compression spring 21 returns the piston 20 to its retracted position, thereby opening the face plate 14.

The arrangement shown is compact, inexpensive and exceedingly light in weight (on the order of 3 ounces). This latter feature is of considerable importance inasmuch as any appreciable additional weight upon the hood will not be tolerated by welders. Further, by the use of a pneumatic drive in the form of an air cylinder, the face plate can be closed quickly and firmly but without undue jarring of the welder. To minimize any jarring effect, it is preferable to line either or both the frames 13 and 16 with a cushioning material such for example as foamed rubber so that when the face plate closes any jarring force will be absorbed by the cushioning material.

In the particular arrangement shown in FIG. 1, the end of the air cylinder piston 20 is simply pivotally linked to a bracket 19 by pin 19a to effect the desired movement of the face plate. Other mechanical movements can, of course, be employed without departing from the invention. For example, the end of the piston may form a rack and the bracket a matching pinion rotatably supported by a fixed pin carried by frame 16. As the piston is extended and retracted, it will rotate the bracket thereby opening and closing the face plate.

There will now be described the operating controls, electrical and pneumatic, for a welding apparatus incorporating the present invention. In FIG. 3 I have diagrammatically indicated a variable current arc welding machine of the inert gas type. In such a device, inert gas such for example as argon or an argon-carbon dioxide mixture is blown from the tip of the welding torch to shield the weld and thereby to prevent its oxidation and consequent destruction by burning. To operate the device, the welder manually closes a switch which opens the inert gas line to activate a "preflow." After a time delay sufficient to permit the flow of enough gas to shield the weld, the electrical circuit closes thereby permitting the arc to be struck. This switch, which is normally in the form of a foot switch, is indicated as SW in FIG. 3. As seen, SW is connected on one side to the positive terminal of a low D.C. voltage source here shown for purposes of illustration as a battery B, and on the other side to one terminal of a relay R1. The other terminal of relay R1 is grounded. Relay R1 contains armatures $a$ and $b$ which operate with contacts A and B respectively. As shown, both the circuits are normally open and both armatures $a$ and $b$ are connected to the positive terminal of battery B. The closing of switch SW therefore energizes relay R1, closing both contacts. This applies the positive battery potential to contact A and accordingly to one terminal of solenoid S1, energizing the solenoid. Solenoid S1 in turn opens valve V1 permitting the inert gas to flow to the welding torch and out the welding tip in the preflow above-described. In accordance with the present invention, an additional valve V2 is provided together with an air line supplied from an air compressor, not shown. Solenoid S1 also opens valve V2 which applies air pressure to the air inlet 17a of the air cylinder 17 forming a part of the welding hood previously described. This causes the face plate 14 to close. Valve V2 also includes a suitable atmospheric bleed off whereby when solenoid S1 is deenergized thereby closing V2, the air is bled off permitting the compression spring 21 to return the piston 20 of the air cylinder to its retracted position.

Operation of the switch SW and accordingly relay R1 also applies the positive battery potential to one terminal of R2 through armature $b$ and the B contact of relay R1. Relay R2 incorporates a short time delay in a manner well known in the art so that it does not operate until a short time after it is energized. Following this time delay normally open armature $c$ of relay R2 closes to contact C, thereby closing the primary circuit of the transformer T in the main welding current supply. This permits current to flow through the main welding leads to form the welding arc. While a generator and transformer have been shown as the current source, a high current generator alone could be employed. In this case, the relay R2 is preferably located in the low current field circuit of the generator.

In the above arrangement, the same switch used to initiate the preflow of inert gas also causes the flow of air to the cylinder 17, closing the face plate 14. The main current circuit, however, remains open for the time delay period of relay R2. The result is that the face plate will be closed before the welder can strike an arc.

The present invention is particularly adapted for use in an inert gas type arc welder of the type incorporating preflow as above described. The reason for this is that the necessary switch and time delay relay is present as the standard equipment and the only modification necessary is the addition of an air supply and an air inlet valve V2 controlled by the same solenoid S1 that controls the valve in the inert gas line. If the inert gas welder does not have provision for preflow, it is necessary to add a time delay relay R2 to prevent the flow of the main welding current until after the air inlet valve has been opened and the face plate closed.

In a conventional electric arc welder (as distinguished from an inert gas type) still further components must be added to incorporate the present invention. In this type, the welding voltage is always present at the welding tip and no switch corresponding to SW is present. Accordingly, to incorporate the present invention in such a welder it is necessary to add this switch, a pair of relays corresponding to R1 and R2, a solenoid S1 and an air valve V2 operated by the solenoid.

In FIGS. 4 through 8 is shown another embodiment of the invention which differs from that shown in FIGS. 1 and 2 primarily in that the mechanism for raising and lowering the glass face plate is changed. Thus, the air cylinder 17 is eliminated and in its stead an inflatable element or air bladder is disposed in a cavity or chamber formed by the face plate carrier and frame so that when air pressure is applied and the bladder thereby inflated, the face plate will close.

As seen in the figures, there is provided a receiving frame 22 which is affixed to the helmet 10. This frame (FIGS. 4 and 5) consists of a rectangular portion 23 having a recess 24 disposed therein to seat the face plate carrier. The upper central portion of the receiving frame 22 forms a cavity or chamber 25. Thus, this portion consists of an upper shelf 26 and a lower shelf 27, joined by a back wall 28 together with a pair of ribs 29 which define the end walls of the cavity. A hole 30 is provided in each rib 29 as shown.

The swinging carrier 31 for the face plate is shown in FIGS. 6–8. This carrier consists of a rectangular portion 32 in which is secured in any suitable manner the opaque glass face plate 33. Extending above and preferably integral with this rectangular portion 32 are a pair of bosses 34 and a rocker plate 35. As best seen in FIG. 7, this rocker plate is preferably inclined slightly outwardly. Extending along the back side of rocker plate 35 is a protuberance or rib 36. When the device is assembled, this member lies adjacent the end of the shelf 27 to close the cavity 25, as best shown in FIG. 5. Holes 31a are provided in bosses 34.

The carrier 31 is supported by the frame 22 by means of pins which extend into the holes 30 in ribs 29 and the holes 31a in bosses 34. A suitable torsion spring mount (not shown) is provided whereby the carrier will normally be in the open position, that is, generally perpendicular to the frame 22. An air bladder 37 is disposed in the cavity 25. When the air pressure is applied to its air inlet port, the bladder will inflate, bearing against rocker plate 35. This will lower the carrier 31, placing the glass face plate in its closed position.

The modification shown in FIGS. 4 through 8 possesses several marked advantages over that of FIGS. 1 and 2. Thus, it is considerably lighter in weight which, as previously noted, is exceedingly important in a device of this type. Further, it is simpler and less expensive.

While there has been described what are at present considered to be the preferred embodiments of the invention, it will be apparent to those skilled in the art that various changes and modifications may be made without departing from the spirit or scope of the invention as defined by the following claims.

I claim:
1. A welding hood for use with an electric arc-welding system comprising a helmet, a face plate hingedly carried on the helmet and adapted to be opened or closed, an air inlet port, means responsive to air pressure at said inlet port to close said face plate, valve means for supplying air pressure to said means, and means associated with the arc-welding system and said valve means for delaying the operation of the arc-welding system for a predetermined period of time after the opening of said valve means.

2. A welding hood as in claim 1 wherein said means comprises an air cylinder carried by said helmet.

3. A welding hood as in claim 1 wherein said means comprises an inflatable air bladder.

4. In a welding hood of the type described for use within an electric arc-welding system, a normally open protective face plate, hinge means attaching said face plate to the helmet, whereby the face plate may be closed, pneumatic means operatively connected to said hinge means and adapted to close the same in response to the application of air pressure, means associated with the arc-welding system for preventing the operation of the arc-welding system for a predetermined period of time after application of air pressure to said pneumatic means.

5. The combination of claim 4 wherein said pneumatic means comprises an air cylinder.

6. The combination of claim 4 wherein said pneumatic means comprises an inflatable air bladder.

7. In an electric arc welder, a welding hood, a protective face plate hingedly carried by said hood, pneumatic means operatively connected to said face plate and adapted to close said face plate in response to the application of air pressure thereto, a valve operative when open to apply air pressure to said pneumatic means, an arcing current supply circuit, a relay in said circuit having normally open contacts and a time delay and a switch operative to open said valve and to energize said relay whereby said face plate is closed and said arcing current supply circuit remains open until after expiration of said time delay.

8. In an electric arc welder, a welding hood, a protective face plate hingedly carried by said hood, pneumatic means operatively connected to said face plate and adapted to close said face plate in response to the application of air pressure thereto, a valve operative when open to apply air pressure to said pneumatic means, a solenoid controlling said valve, an arcing current supply circuit, a relay in said circuit having normally open contacts and a time delay and a switch operative to energize said solenoid and said relay whereby said face plate is closed and said arcing current supply circuit remains open until after expiration of said time delay.

9. In an inert gas type electric welder of the type utilizing a welding hood and a protective face plate hingedly carried by said hood, the combination of a pneumatic means for closing said face plate, a first valve operative to open and close an air supply to said pneumatic means, a second valve operative to open and close an inert gas supply to the welding torch of said welder, a solenoid for controlling both of said valves, a time delay relay operative to open and close the arcing current supply circuit of said welder, an energizing circuit for said relay and said solenoid and a switch in said energizing circuit.

10. The combination as set forth in claim 9 wherein said pneumatic means comprises an air cylinder.

11. The combination as set forth in claim 9 wherein said pneumatic means comprises an inflatable air bladder.

12. A welding hood for use with an electric arc-welding system comprising a helmet, a face plate hingedly carried on the helmet and adapted to be in an opened or closed position, an air inlet port, means responsive to air pressure at said inlet port to place said face plate in one of said positions, spring means operable to place said face place in the other of said positions, valve means for supplying air pressure to said first means, and means associated with the arc-welding system and said valve means for delaying the operation of the arc-welding system for a predetermined period of time after the operation of said valve means.

13. In a welding hood of the type described for use with an electric arc-welding system, a protective face plate, hinge means attaching said face plate to the helmet, whereby the face plate may be in an opened or closed position, control means including pneumatic means operatively connected to said hinge means and adapted to place said face plate in one of said positions in response to the application of air pressure and spring means adapted to place said face plate in the other of said positions in the absence of air pressure, and means associated with the arc-welding system for preventing the operation of the arc-welding system for a predetermined period of time after operation of said control means to close said face plate.

14. In an electric arc welder, a welding hood, a protective face plate hingedly carried by said hood, control means including pneumatic means and spring means operatively connected to said face plate and adapted to open and close said face plate in response to the application and cut-off of air pressure thereto, a valve operative to control the application of air pressure to said pneumatic means, an arcing current supply circuit, a relay in said circuit having normally open contacts and a time delay and a switch operative to control said valve and to energize said relay whereby said face plate is closed and said arcing current supply circuit remains open until after expiration of said time delay.

15. In an inert gas type electric welder of the type utilizing a welding hood and a protective face plate hingedly carried by said hood, the combination of a control means including pneumatic means for opening and closing said face plate, a first valve operative to open and close an air supply to said pneumatic means, a second valve operative to open and close an inert gas supply to the welding torch of said welder, a solenoid for controlling both of said valves, a time delay relay operative to open and close the arcing current supply circuit of said welder, an energizing circuit for said relay and said solenoid and a switch in said energizing circuit.

References Cited in the file of this patent

UNITED STATES PATENTS

| | | |
|---|---|---|
| 1,497,012 | Goodspeed | June 10, 1924 |
| 2,154,774 | Rienacher et al. | April 18, 1939 |
| 2,418,415 | Leser | April 1, 1947 |
| 2,582,860 | Clerke | Jan. 15, 1952 |
| 2,728,077 | Dening | Dec. 27, 1955 |
| 2,761,046 | Herrick et al. | Aug. 28, 1956 |
| 2,778,928 | Morrell | Jan. 22, 1957 |